US008438306B2

(12) United States Patent
De Lescure et al.

(10) Patent No.: US 8,438,306 B2
(45) Date of Patent: May 7, 2013

(54) APPARATUS AND METHODS FOR ON LAYER CONCURRENCY IN AN INTEGRATED CIRCUIT

(75) Inventors: Benoit De Lescure, La Colle-sur-Loup (FR); Krishnan Srinivasan, San Jose, CA (US)

(73) Assignee: Sonics, Inc., Milpitas, CA (US)

( * ) Notice: Subject to any disclaimer, the term of this patent is extended or adjusted under 35 U.S.C. 154(b) by 212 days.

(21) Appl. No.: 12/938,120

(22) Filed: Nov. 2, 2010

(65) Prior Publication Data

US 2012/0110106 A1 May 3, 2012

(51) Int. Cl.
*G06F 13/00* (2006.01)
(52) U.S. Cl.
USPC .................. 709/238; 709/249; 709/250
(58) Field of Classification Search .......... 709/223, 709/226, 238, 248, 249, 250
See application file for complete search history.

(56) References Cited

U.S. PATENT DOCUMENTS

| | | | |
|---|---|---|---|
| 5,948,089 A | 9/1999 | Wingard et al. | |
| 6,182,183 B1 | 1/2001 | Wingard et al. | |
| 6,330,225 B1 | 12/2001 | Weber et al. | |
| 6,578,117 B2 | 6/2003 | Weber | |
| 6,725,313 B1 | 4/2004 | Wingard et al. | |
| 6,961,834 B2 | 11/2005 | Weber | |
| 7,120,712 B2 | 10/2006 | Wingard et al. | |
| 7,296,105 B2 | 11/2007 | Weber et al. | |
| 7,325,221 B1 | 1/2008 | Wingard et al. | |
| 7,383,352 B2 * | 6/2008 | Hicok et al. | 709/238 |
| 7,701,252 B1 * | 4/2010 | Chow et al. | 326/41 |
| 2002/0129173 A1 | 9/2002 | Weber et al. | |
| 2003/0004699 A1 | 1/2003 | Choi et al. | |
| 2003/0074520 A1 | 4/2003 | Weber et al. | |
| 2004/0177186 A1 | 9/2004 | Wingard et al. | |
| 2007/0094429 A1 | 4/2007 | Wingard et al. | |
| 2007/0198756 A1 | 8/2007 | Norgaard | |
| 2008/0043757 A1 * | 2/2008 | Dielissen | 370/400 |
| 2008/0136641 A1 | 6/2008 | Kean | |
| 2008/0301708 A1 | 12/2008 | Hamilton | |
| 2008/0320476 A1 | 12/2008 | Wingard et al. | |
| 2011/0213949 A1 | 9/2011 | Jayasimha et al. | |

OTHER PUBLICATIONS

Wingard, D., "Socket-Based Design Using Decoupled Interconnects," *Interconnect-Centric Design for Advanced SOC and NOC*, Chapter 14, (2002) 30 pages.
Weber, Wolf-Dietrich, "Efficient Shared DRAM Subsystems for SOC's", Sonics, Inc., (2001) 6 pages.

(Continued)

*Primary Examiner* — Viet Vu
(74) *Attorney, Agent, or Firm* — Rutan & Tucker, LLP

(57) ABSTRACT

A method, apparatus, and system for providing layer concurrency connecting two or more master Intellectual Property cores to a Network on a Chip (NoC) for an integrated circuit is provided. An embodiment includes two masters connected using a common tightly coupled protocol to a first interface of an NoC. A protocol conversion unit can be coupled between the two or more masters and the NoC to convert a request in the tightly coupled protocol to a decoupled protocol that decouples request phasing from response phasing and then passes the request in the decoupled protocol format onto the NoC. The system also provides for arbitration amongst the two or more masters. Requests from the masters are still in the common tightly coupled protocol and are translated by the protocol conversion unit into a request in a decoupled protocol to enable out of order return of responses.

19 Claims, 7 Drawing Sheets

OTHER PUBLICATIONS

OCP (Open Core Protocol) Specification, Release 2.0, OCP International Partnership, (2003) OCP-IP Association, pages 210 total.
Wingard, Drew, "A Non-Blocking Intelligent Interconnect for AMBA-Connected SoCs," Sonics, Inc., Co-Ware Arm Developer's Conference, (Oct. 2005) 39 pages.

Weber, Wolf-Dietrich et al., "A Quality-of-Service Mechanism for Interconnection Networks in System-on-Chips," 1530-1591/05, (2005) IEEE, 6 pages.
Wingard, Drew Titles: The Heterogeneous Processing Abstraction for MPS0C, Jul. 2004, pp. 1-35.

* cited by examiner

APPARATUS AND METHODS FOR ON LAYER CONCURRENCY IN AN INTEGRATED CIRCUIT

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD OF THE INVENTION

Embodiments of the invention generally relate to electronic circuitry.

More particularly, an aspect of an embodiment of the invention relates to a Network on a Chip (NoC).

BACKGROUND OF THE INVENTION

Typical initiators include processors, DSP, graphic accelerators, DMAs engines. Typical slaves include register banks and memory. Example memories include static memory, dynamic memory, read-only memory, flash memory, etc. An initiator in an NoC can use the concept of an address to access a destination (target/slave) of a particular request. In addition, a typical NoC may provide a protocol translation required to enable communication between masters and slaves using different interface protocols, like AHB, AXI, OCP, etc.

In various systems, designing and implementing an NoC for attachment to multiple masters with an AMBA-AHB interface is done using one of the two following approaches: (1) each master is having its own NoC master port or (2) an AMBA-AHB bus is used to connect multiple AHB masters to a single NoC port.

The first solution, (1), offers the highest possible performances, as each request from a different master can be translated independently to a request in the NoC protocol. The request can then be forwarded to the NoC fabric. Therefore if multiple masters are issuing requests simultaneously, the translation operations occur in parallel and they all can proceed as fast as allowed by the chosen NoC fabric architecture. This solution has a high hardware cost of one NoC master port per AHB master, however.

The second solution, (2), on the other hand, offers lower gate count, at the expense of strongly limited performances. In a system using the second solution, all requests presented to an AHB bus will be arbitrated and serialized one at a time on the AHB bus. An AHB request typically might include a burst of two to sixteen beats. Each beat might include one address phase, which is the request, followed by one data phase that can overlap with the next address phase. The data phase can only terminate when the slave that was the destination of the associated address phase, has sent a response. Typically, in an NoC, the number of clock cycles between a request (address) and associated response (data) can be high, in the range of 10 to 100 cycles. Therefore, a burst on an AHB bus can occupy the AHB bus for a long time and in a rather inefficient way.

SUMMARY OF THE INVENTION

Various methods and apparatus including a system for connecting two or more masters to the Network on the Chip (NoC) for an integrated circuit are described. Such a system may include an NoC, which is a communication-bus type module that includes transaction flow control logic, registers, and volatile memory components, including buffers. These can route requests and responses from masters to targets and back, even when masters and targets have different interface protocols, data width, or clock speed. The NoC can have internal flow control logic to that supports sending a response back to the master out-of-order from the order in which the corresponding request was issued from the master.

In an embodiment, a layer connects to two or more masters that use a common tightly coupled protocol. The layer can have the components of multiple ports connecting to a multiplexer. A protocol conversion unit that converts a request in the tightly coupled protocol, which couples request phasing with response phasing, over to a decoupled protocol, which decouples request phasing from response phasing, and then passes the request in the decoupled protocol format onto the NoC. Additionally, the multiplexer can connect to the arbitration unit, which connects to the protocol translation unit and thread management logic, registers, and buffers to track threads issued from the layer onto the NoC.

BRIEF DESCRIPTION OF THE DRAWINGS

The drawings refer to embodiments of the invention in which.

Figure 1:
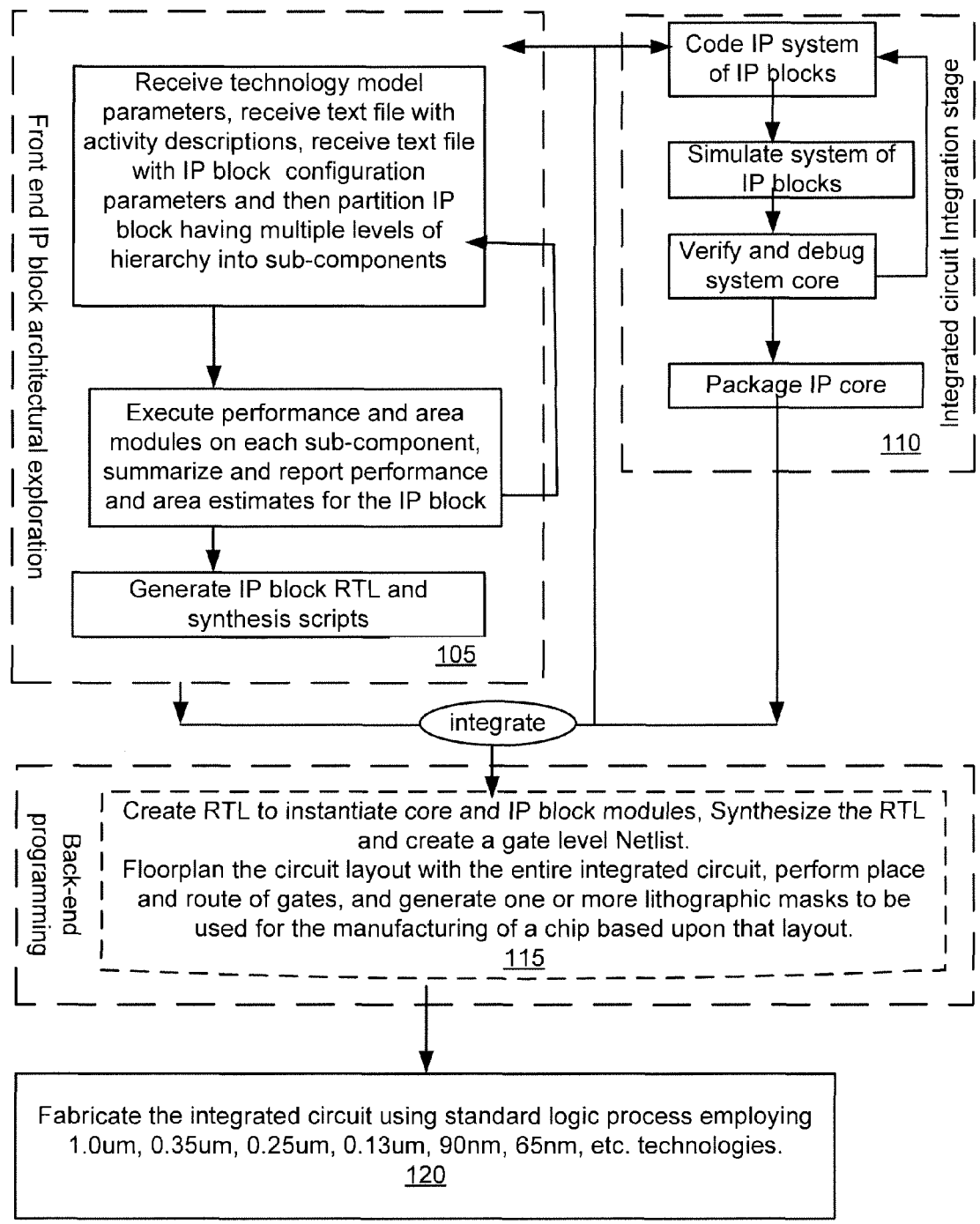
FIG. 1 illustrates a flow diagram of an embodiment of an example of a process for generating a device, such as a System on a Chip, in accordance with the systems and methods described herein.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, number of memory channels in an aggregate target, etc., in order to provide a thorough understanding of the present invention. However, it will be apparent to a person of ordinary skill in the art that the present invention may be practiced without these specific details. In other instances, well known components or methods have not been described in detail, but rather in a block diagram in order to avoid unnecessarily obscuring the present invention. Further, specific numeric references, such as first target, may be made. However, the specific numeric reference should not be interpreted as a literal sequential order, but rather interpreted that the first target is different from a second target. Thus, the specific details set forth are merely exemplary. The specific details may be varied from, and still be contemplated to be, within the spirit and scope of the present invention.

An embodiment includes features such as decreasing the amount of address wires to do an address decode in a branch. An embodiment includes features such as externally controlling for QoS the arbitration priority. An embodiment includes features such as layer concurrency connecting masters to the interconnect. Embodiments can also include some combination of these.

An embodiment includes systems, methods, and apparatus for connecting two or more masters to the Network on the Chip (NoC) for an integrated circuit comprising. In an example, an NoC routes requests and responses from masters to targets and back, even when masters and targets have different interface protocols, data width, or clock speed. The NoC can be a communication-bus type module that includes transaction flow control logic, registers, and volatile memory components, including buffers. Additionally, the NoC can have internal flow control logic that supports sending a response back to the master out-of-order from the order in which the corresponding request was issued from the master.

In an embodiment, a layer can connect to two or more masters. These masters may use a common tightly coupled protocol. Additionally, the layer can include components of multiple ports connecting to a multiplexer. The multiplexer may be connected to the arbitration unit. The arbitration unit may be connected to a protocol translation unit, thread management logic, registers, and buffers to track threads issued from the layer onto the NoC. The protocol conversion unit converts a request in the tightly coupled protocol, which couples request phasing with response phasing, over to a decoupled protocol, which decouples request phasing from response phasing, and then passes the request in the decoupled protocol format onto the NoC. Arbitration amongst the two or more masters occurs while the requests from the masters are still in the common tightly coupled protocol used by the masters. And, only then the winning request in the tightly coupled protocol is translated by the protocol conversion unit into a request in a decoupled protocol to enable out of order return of responses.

FIG. 1 illustrates a flow diagram of an embodiment of an example of a process for generating a device, such as a System on a Chip, for example, using an Electronic Design Automation (EDA) toolset. An example device can include a layer that has a protocol conversion unit that converts a request in the tightly coupled protocol. The layer can couple request phasing with response phasing, over to a decoupled protocol, which decouples request phasing from response phasing, and then passes the request in the decoupled protocol format onto the NoC. Additional details of FIG. 1 will be discussed below.

Figure 2:
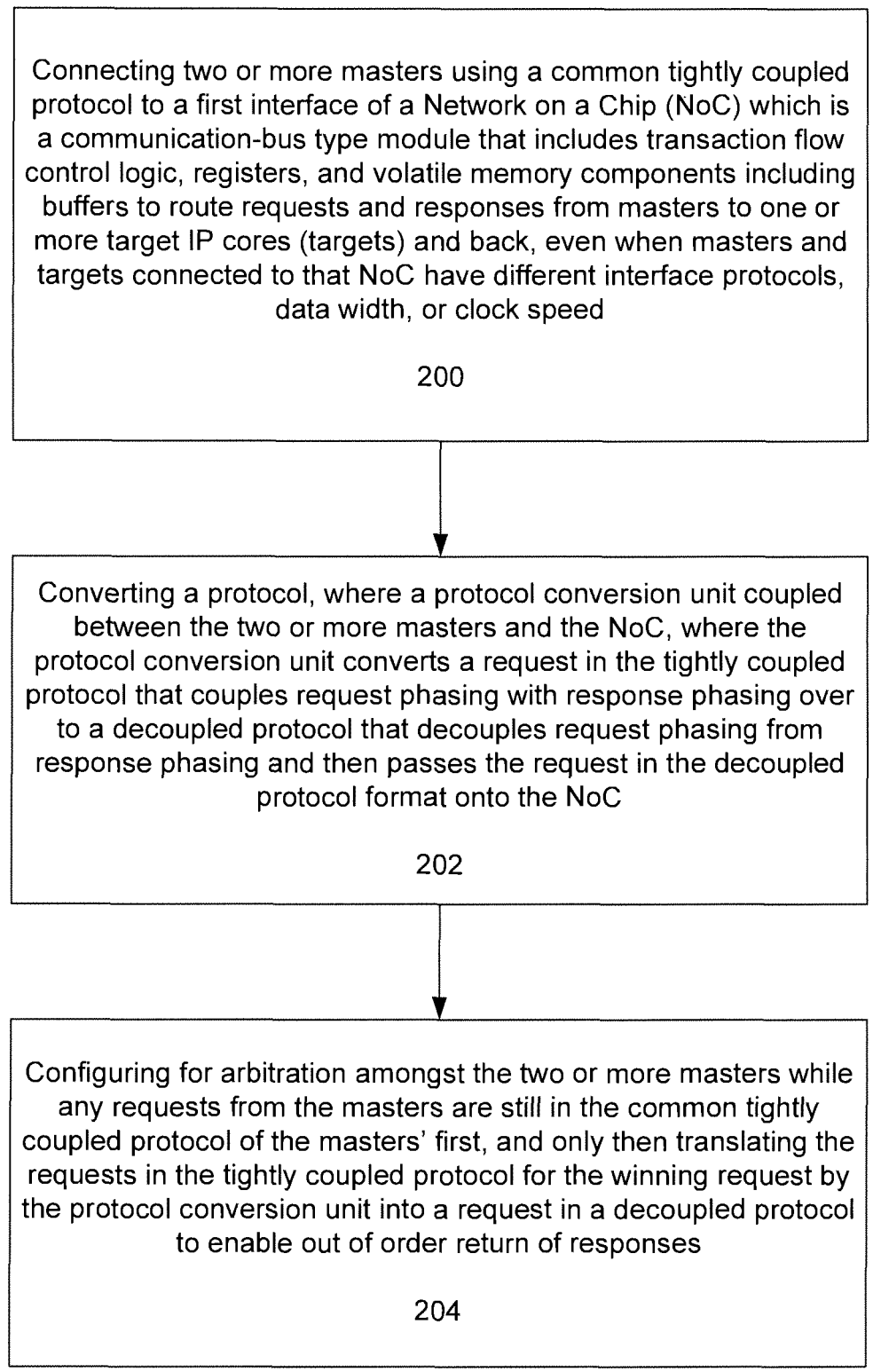
FIG. 2 illustrates a flow diagram of an embodiment of an example of a process for connecting two or more masters to the Network on the Chip for an integrated circuit.

FIG. 2 illustrates a flow diagram of an embodiment of an example of a process for connecting two or more masters to the Network on the Chip for an integrated circuit. Referring now to FIG. 2, in step 200 multiple AHB using a common tightly coupled protocol are connected to a first interface of an NoC. The NoC may be an interconnect communication-bus type module that can include the required transaction flow control logic, registers, and volatile memory components. For example, such a module may include buffers to route requests and responses from masters to one or more target IP cores (targets) and back, even when masters and targets connected to that NoC have different interface protocols, data width, or clock speed, etc.

Additionally, the NoC may have internal flow control logic to support multiple protocols, such as OCP multithread protocol and AXI protocol. These protocols support sending a response back to the master out-of-order from the order in which the corresponding request was issued from the master.

In step 202, the method converts a protocol. For example, a protocol conversion unit may be coupled between the two or more masters and the NoC and this protocol conversion unit may translate the request. The protocol conversion unit can convert a request in the tightly coupled protocol that couples request phasing with response phasing over to a decoupled protocol that decouples request phasing from response phasing. Additionally, a protocol conversion unit may convert a request in a non-pipelines protocol that couples request phasing with response phasing to pipeline responses back to a master. Accordingly, the protocol decouples requests and responses. The protocols may include the OCP and AXI protocols. Additionally, the NoC can implement a non-pipelined protocol that couples request phasing with response phasing to the NoC.

The translation can be into a request in a decoupled protocol that can use multiple thread IDs or tag IDs to enable out of order return of responses. The protocol conversion unit may then pass the request in the decoupled protocol format onto the NoC.

In step 204, the method configures for arbitration amongst the two or more masters. In one embodiment, a request from a master is translated and converted to an internal protocol, which is not the NoC protocol. The request may be arbitrated. The winner of the arbitration can be converted to a request following the OCP multithreaded protocol. Any requests from the masters may still be in the common tightly coupled protocol of the masters' first. The method can then translate the requests in the tightly coupled protocol for the winning request.

In one embodiment, a portion of NoC functionality may generally replace such that one NoC port can be used for each master even when a common protocol is used and each master request is independently translated to the NoC protocol. A proposed method can be applicable when multiple masters use the same protocol. Arbitration might be performed amongst the masters first, and only then translating the protocol for the winning request using multiple threads, IDs or tags to enable the out of order return of responses. This allows for area reduction (compared to using one NoC port per master) while maintaining a high level of performance thanks to the use of out-of-order responses.

The OCP multithreaded request may be converted in an NoC protocol using a conversion unit can convert requests in a non-pipelined protocol that couples request phasing with response phasing.

The embodiments described might use hardware logic, software visible registers, or some combination thereof to allow a user to configure the system. The registers might map a non-pipelined master to a tag or thread identification associated with registers. The registers can be in a layer that implements a non-pipeline protocol and maps responses back to corresponding master tag or thread identification. Additionally, the non-pipelined protocol can include the AHB protocol. Pipelined, with respect to the NoC, means moving commands, data, or both across an NoC in stages.

Figure 3:
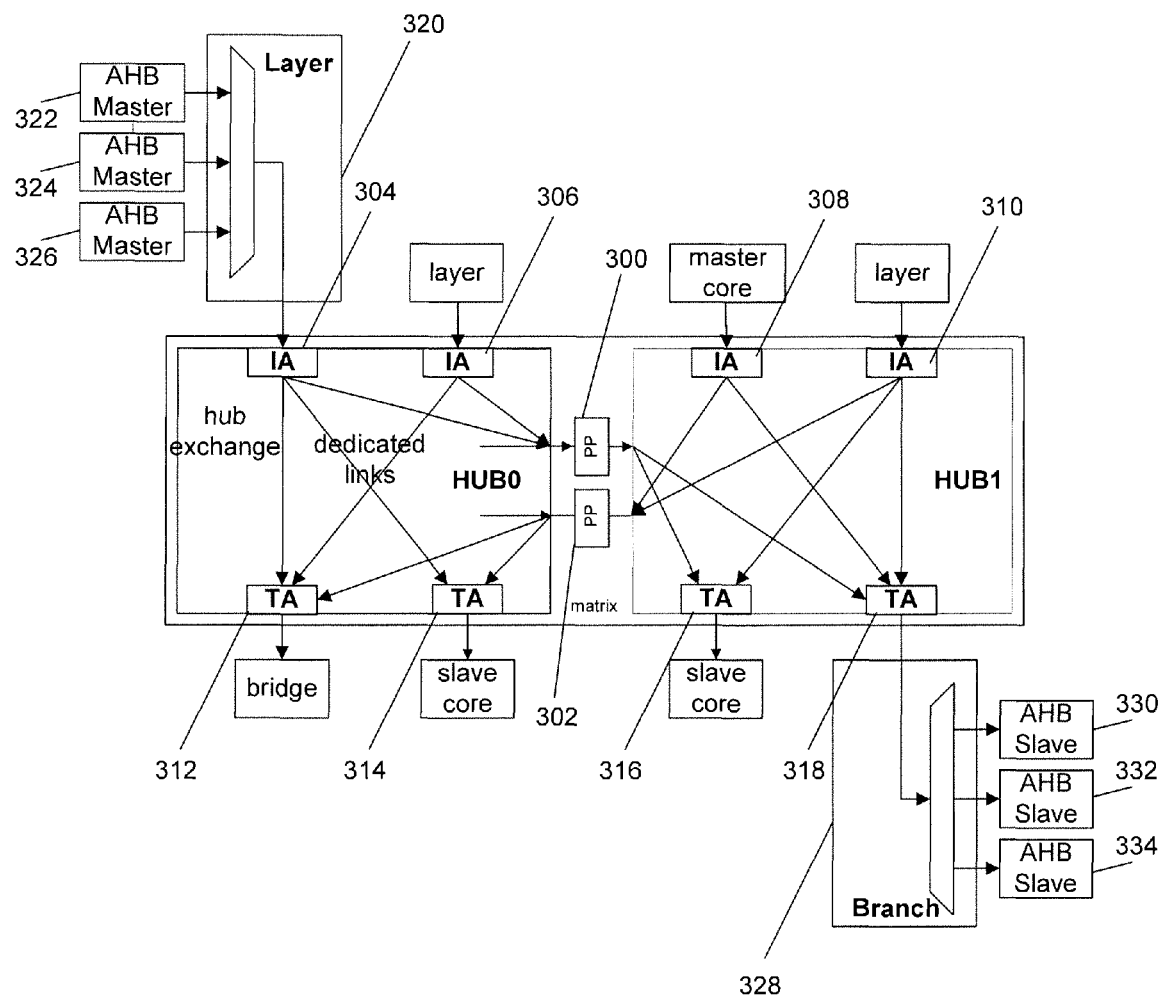
FIG. 3 illustrates a block diagram of an example embodiment of a process for connecting two or more masters to the Network on the Chip for an integrated circuit.

FIG. 3 illustrates a block diagram of an example embodiment of a process for connecting two or more masters to the NoC for an integrated circuit. In the illustrated example, a system may include two hubs ("HUB0" and "HUB1") interconnected through pipeline points 300 and 302. Each hub may embed a number of initiator agents 304, 306, 308, and 310 and target agents 312, 314, 316, and 318. A layer component 320 connected to HUB0 allows three initiators 322, 324, and 326, which happen to be AHB master devices in this example, to send traffic to a single port of HUB1. A branch component 328 connected to HUB1 distributes traffic from one target agent to three slave devices 330, 332, and 334. One of the target agents in HUB1 embeds two register slices. Two separate pipeline points 300 and 302 may be used for requests going from HUB0 to HUB1 and vice-versa.

A layer component 320 allows multiple AHB masters to be connected to one initiator agent in a hub. In the illustrated example, all initiators 322, 324, and 326 connected to the layer 320 may be of the same type and may be identically configured. Additionally, the may use the same protocol, have the same data bus width, and be part of the same clock domain. Some embodiments may use AMBA Protocol (SNAP™). In such an embodiment, the interconnect comprises a high-performance interconnect with multiport AHB master layers and multiport AHB or APB slave branches.

The layer component 320 may attach to a hub initiator agent using an OCP2 socket that can be automatically configured by various tools. Additionally, the layer component 320 may perform protocol conversion between the AHB-Lite protocol and the OCP2 protocol.

One example system for connecting two or more masters may include an NoC that can be a communication-bus type module. The NoC may also include the required transaction flow control logic, registers, and volatile memory components, including buffers, to route requests and responses from masters to targets and back, even when masters and targets have different interface protocols, data width, or clock speed. For example, the NoC can be a communication bus module, which includes a register resource to route requests and responses even when the requestor or responder have different data width or clock speed requirements. Multiple masters, such as a first and second master can be connected to the NoC.

Additionally, the NoC can have internal flow control logic that supports sending a response back to the master out-of-order from the order in which the corresponding request was issued from the master. The layer 320 connecting to two or more masters 322, 324, and 326 may use a common tightly coupled protocol. The layer may also have the components of multiple ports connecting to a multiplexer. The multiplexer can connect to the arbitration unit and the arbitration unit can connect to the protocol translation unit and thread management logic, registers, and buffers. This can be done to track threads issued from the layer onto the NoC.

In an embodiment, the NoC implements a pipelined and tightly coupled protocol that couples request phasing with response phasing such as AHB protocol. One NoC port can be used for each master connecting to the layer containing the arbitration unit and the protocol conversion unit even when a common tightly coupled protocol is used by each master and each master request is independently translated to the decoupled protocol.

For example, one master might always communicate with only one slave. Accordingly, multiple masters and multiple slaves might communicate using fewer address bits. One embodiment may include multiple masters with one address. In such an embodiment, each master may have an identification assigned by the NoC. Additionally, there may be three possible initiators from a region. Each of the e.g., three initiators communicates with a single slave such that the NoC can route communications between a master and a slave. Further, communication using a single address for each master may be performed in conjunction with identification assigned by the NoC to determine a routing of a communication to or from a slave. The single address can be shared by the multiple masters using the identification assigned by the NoC and the mapping of a master to a particular slave.

An embodiment includes layer concurrency providing for connection of masters to the interconnect. One example method to connect multiple masters efficiently to a network on chip provides for use with various protocols such as OCP, AXI, or other protocols that supports out-of-order responses.

Figure 4:
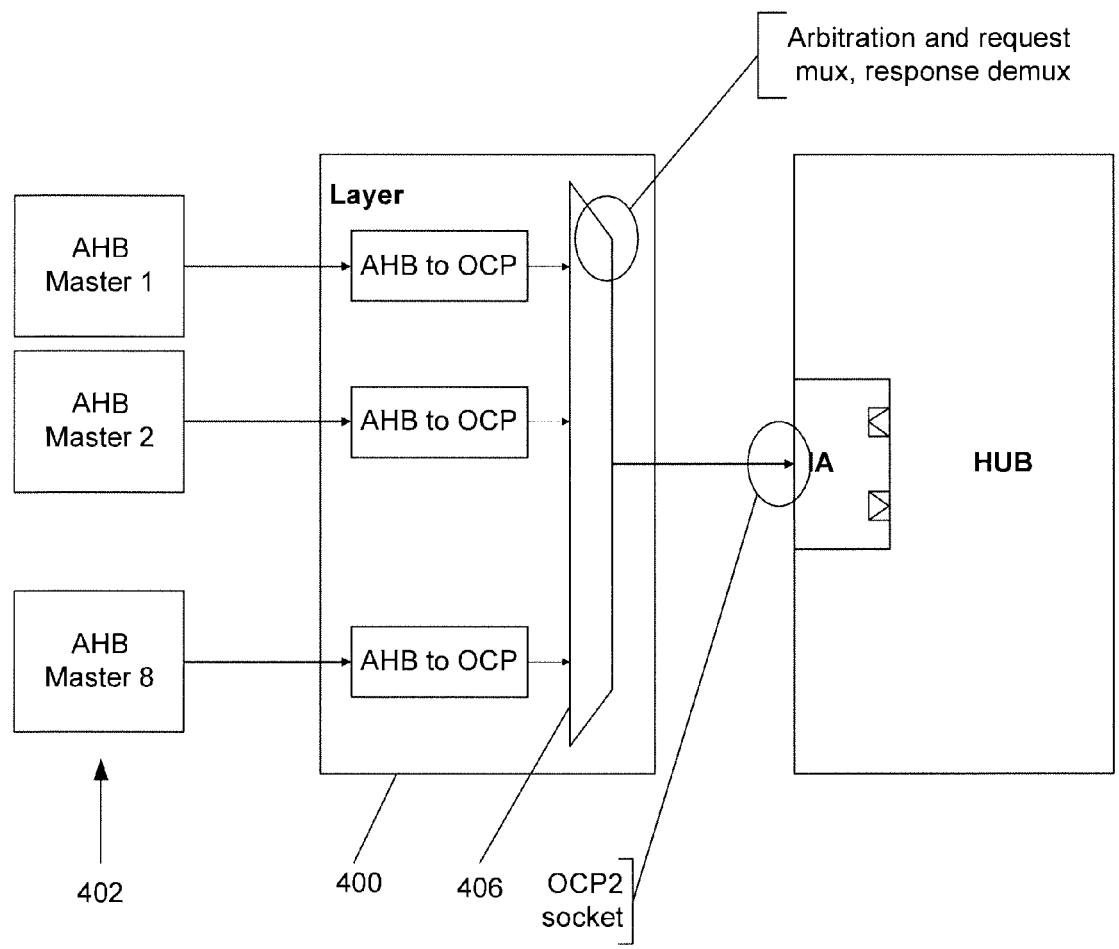
FIG. 4 illustrates a block diagram of an example layer component that connects eight AHB master devices to a single hub initiator agent (IA).

FIG. 4 illustrates a block diagram of an example layer component 400 that connects eight AHB master devices 402 to a single hub 404 initiator agent (IA). Referring now to FIG. 4, an example of a layer component that connects eight AHB master devices to a single hub initiator agent (IA is discussed).

The layer 400 can include a multiplexer 406, wherein, when 'concurrency'>1, the layer is capable of having multiple transfers open at once. Additionally, when multiple transfers are open at once, each master 402 interface needs has an address decoder to select its target so that target contention can be resolved.

For example, the layer 400 might include the multiplexer 406, which may be configured to have multiple transfers open at once. When multiple transfers are open at once, each master 402 interface has an address decoder to select its target so that target contention can be resolved. Additionally, the interconnect can comprise a high-performance interconnect with multiport AHB master layers and multiport AHB or APB slave branches.

In some embodiments, masters may be multiplexed in time across different concurrent ongoing transactions such that the OCP threads are used to connect the so-called AHB the layer to an NoC port to achieve good performance at a moderate hardware cost. Additionally, from a hardware cost standpoint, like a bus structure, such a structure might be used to deal with multiple requests at the same time, instead of being only capable of dealing with one request at a time. Additionally, the bus-like structure used can be a fine-grained structure multiplexed in time between multiple concurrent requests that can be outstanding going across the NoC at the same time.

The NoC can be configured to support sending responses back to a master out of order in which a corresponding request was issued by the master. OCP threads may be used to implement the bus-like structure. This bus-like structure can be multiplexed in time across different concurrent ongoing transactions such that the OCP threads are used to connect a layer to an NoC port. This may be done to achieve increased performance at a moderate hardware cost. Additionally, a bus structure may be used as a fine-grained structure multiplexed in time between multiple concurrent requests that can be ongoing simultaneously.

In some embodiments, the layer 400 has a run time configurable parameter, configurable, for example, by a designer of the chip to select the number of OCP threads the layer 400 can be capable of processing and configured with instances of logic to present threads to the NoC. For example, in recognition of the fact that not all masters will be active at once, the designer of the chip can be allowed to specify a maximum concurrency supported, independently from an actual number of masters connected to that layer.

A maximum concurrency may be used to configure the number of threads in the OCP interface. Masters may be permitted to contend dynamically for use of the threads, permitting the user to directly control the cost vs performance trade-off. The parameter specifies a maximum number of transfers that may be open at any one time on the layer.

In some embodiments, one NoC port can be used for each master even when a common protocol is used and each master request might be independently translated to the NoC protocol. The NoC may include a layer that is architected to minimize the number of threads it presents to an exchange. The NoC can include an input that allows a user to specify a maximum concurrency supported, independently from an actual master connectivity configured. Additionally, a maximum concurrency may be used to configure the number of threads in the interface. Masters may be permitted to contend dynamically for use of the threads, and wherein a parameter specifies a maximum number of transfers that may be open at any one time on the layer.

Figure 5:
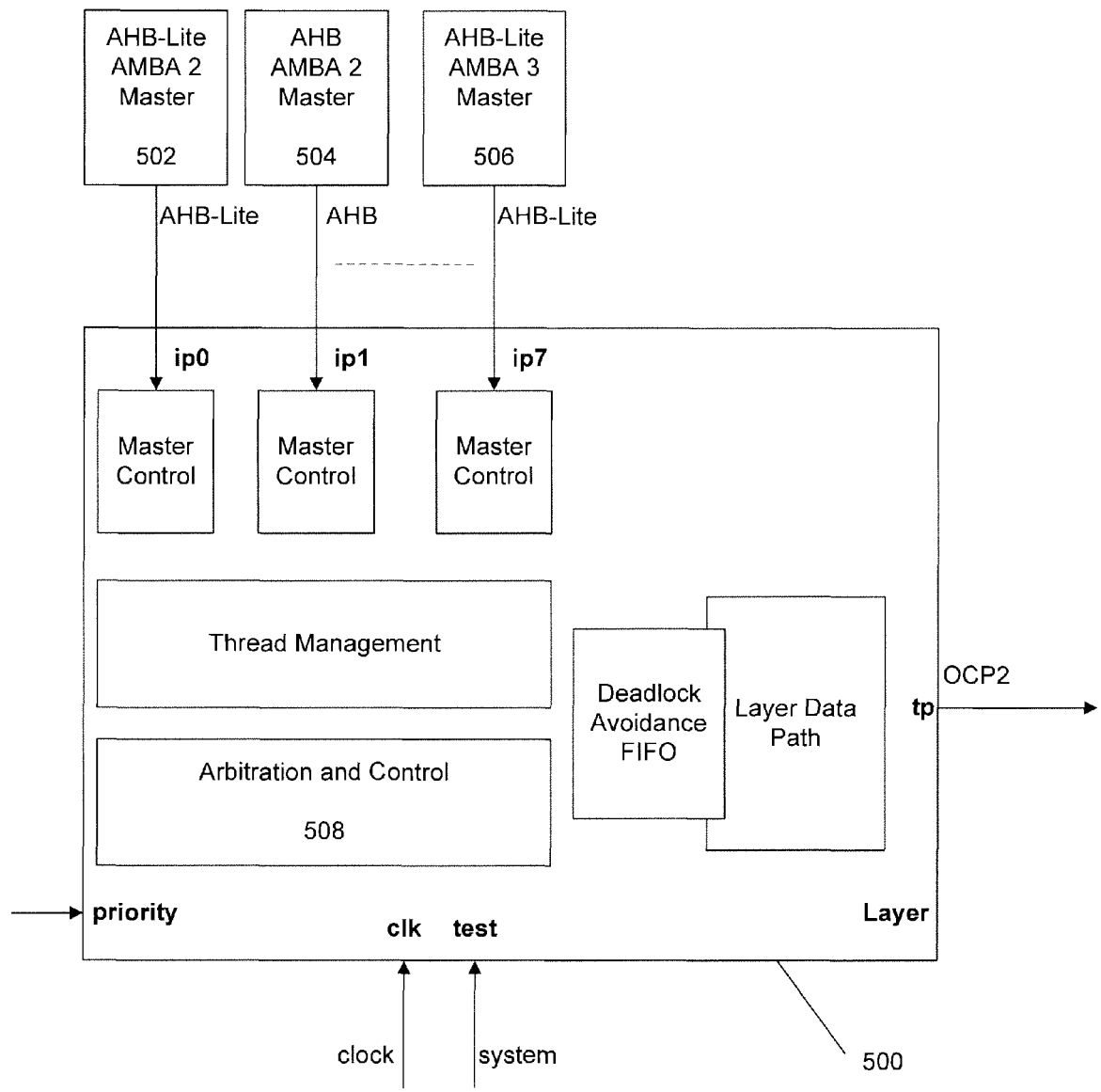
FIG. 5 illustrates a block diagram of another example layer component in accordance with an embodiment.

FIG. 5 illustrates a block diagram of another example layer component 500 in accordance with an embodiment. As illustrated in FIG. 5, two or more masters 502, 504, 506 may use an AHB type of the tightly coupled protocol. The protocol(s) used may include AHB 504 and AHB-Lite 502, 506. A request in the AHB type of the tightly coupled protocol format from each AHB master can be translated and converted to an internal protocol in a layer 500 between the NoC and the masters 502, 504, 506. In an embodiment, the internal protocol is not the NoC protocol. In some embodiments, the protocol implemented on the NoC may be the same as the internal protocol of the layer. Additionally, the layer 500 contains the arbitration unit 508 and the protocol conversion unit.

Arbitrated unit 508 may determine a "winner" of an arbitration. The winner can be converted to a request following the internal protocol which can be a multiple threaded protocol, such as OCP. For example, in some embodiments, a layer component can includes logic to arbitrate simultaneous requests from multiple masters. The requests may be multiplexed to the attached initiator agent. This can allow a user to select between two arbitration protocols and two models of concurrency to optimize latency and throughput for the attached masters and the gate count of the layer component.

For example, the layer 500 can include logic to arbitrate simultaneous requests from multiple masters. These requests can be multiplexed to the attached initiator agent. Additionally, a user can select between two arbitration protocols and two models of concurrency to optimize latency and throughput for the attached masters and the gate count of the layer component.

The multiple threaded protocol can be used to manage concurrency of multiple requests issued from the layer at the same time and out of order responses coming back to the layer for those outstanding concurrent requests. Additionally, a multiple threaded request in an internal protocol format may be converted by an NoC protocol, for example, when the protocol of the NoC differs from internal protocol of the layer 500. Some embodiments convert the multiple threaded requests into the protocol of the NoC such as that protocol is the AHB type of the tightly coupled protocol that couples request phasing with response phasing.

In some embodiments, the layer component uses a fixed priority arbitration scheme by default to arbitrate among competing requests. In this one-level scheme, the attached masters may be numbered and lower-numbered masters might have priority over higher-numbered masters, i.e., lower-numbered masters will always win.

In another embodiment, a user may optionally specify the use of a priority input. This can enable a priority selector port in the layer component. In an embodiment, the priority selector port provides an active high priority input signal per master. This signal can be used in a two-level arbitration scheme comprising. In an embodiment, arbitration follows the one-level, fixed priority scheme, and the lowest-numbered master wins when no master has its priority input signal asserted. For example, a master with a priority input signal asserted might win when only that master has its priority input signal asserted. The lowest numbered master with an active priority input wins when more than one master has its priority input signal asserted.

Enabling the priority input port also enables an output port with one active high output per master. In each cycle, the output signal corresponding to the winning master may be asserted. When desired, these output signals can be used in conjunction with external logic to drive the priority input signals and so implement a fair arbitration protocol.

By default, a layer component allows only one AHB transaction to be in progress at one time, and hence the layer arbitration logic considers only a single AHB transaction per arbitration round. The user can configure the layer to support concurrent transactions, in which case arbitration can be performed on the set of open transactions. The maximum number of concurrently open transactions supported by the layer may be referred to as the level of concurrency or the concurrency level. The user can assign each master in a layer to a concurrency group; there can be up to N concurrency groups, where N is the number of masters attached to the layer.

In another embodiment, an NoC may be configured to support concurrent transactions such that a layer is able to send requests from multiple masters to one or more targets concurrently. The system can be configured to receive the responses from the targets out of order and distribute them properly to the respective masters. Increases in the concurrency level can increase the gate count of the layer component (and hence its area), however.

Such an embodiment may use an arbitration protocol that may be configured such that, when any master in a concurrency group has an open locked transaction, no further transactions from any other master in the group may be opened. Additionally, concurrency groups may be numbered e.g., sequentially, starting at 1 and each master in a layer can be assigned to a concurrency group using the Concurrency field shown in the Concurrency sub-tab of the Performance and QoS tab. When the layer has a single master, it can be assigned to concurrency group 1 by default.

Additionally, masters assigned to different concurrency groups may be serviced concurrently. Further masters assigned to the same concurrency group can be serviced sequentially. This increase in the concurrency level may increase overall system performance at the expense of increased layer area and thus allow the designer to fine-tune area-performance trade-offs.

In some embodiment, the number of threads in the layer's OCP interface may matches the layer's concurrency level. For example, a layer with no concurrency has a single threaded OCP interface, and a layer with two levels of concurrency has an OCP interface with two threads. The layer component supports a maximum of eight levels of concurrency.

Figure 6:
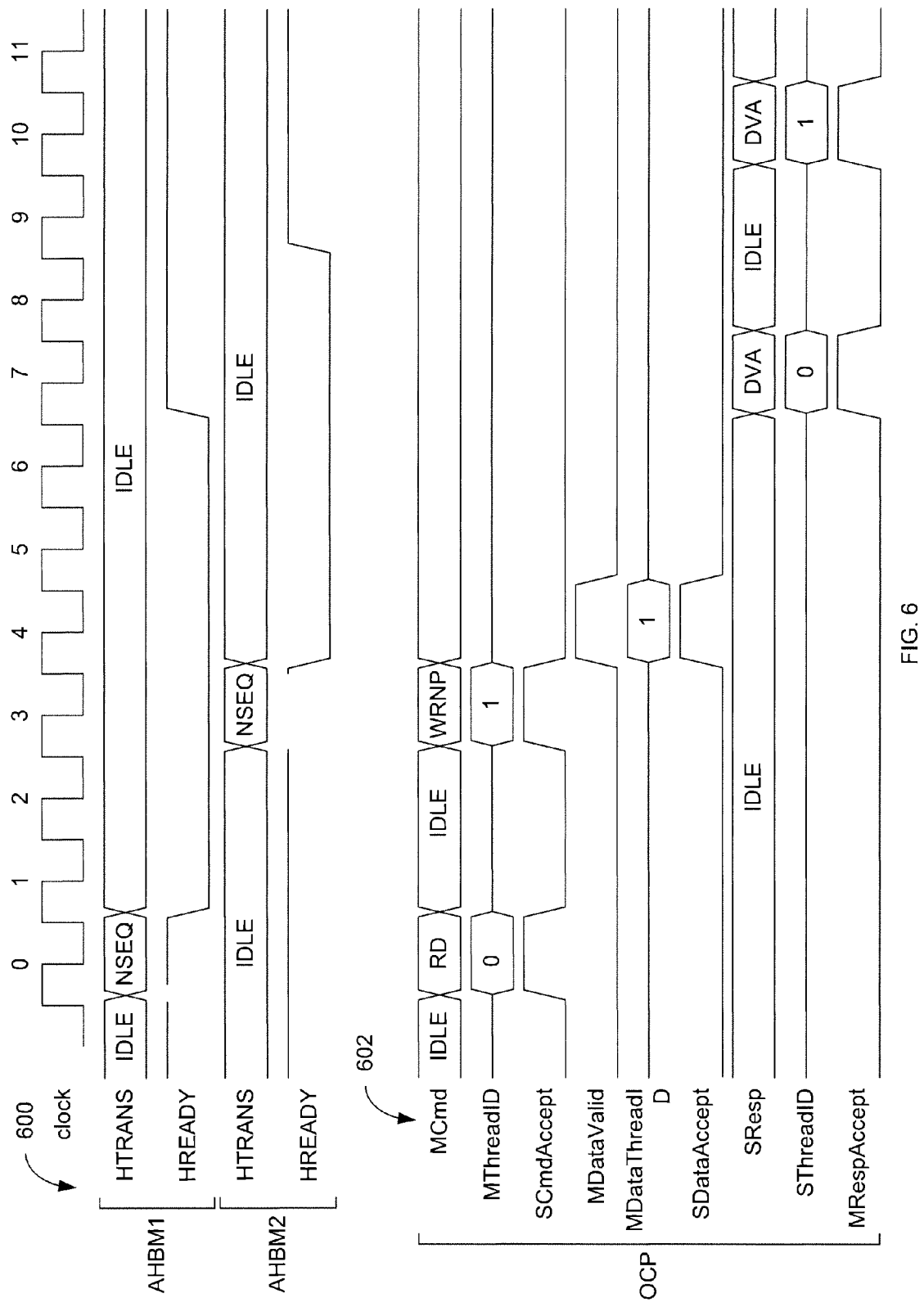
FIG. 6 illustrates an example timing diagram in accordance with an embodiment.

In some embodiments, multiple threads that have issued one or more requests from the layer onto the NoC and the responses returning back to the NoC, may be managed. Additionally, the NoC can support sending responses back to a master out of order in which a corresponding request was issued by the master. OCP threads can be used to implement the bus-like structure in the layer. One example of signal timing in such a bus-like structure is illustrated in FIG. 6, which illustrates an example timing diagram in accordance with an embodiment. As illustrated, timing for a pair of AHBM masters 600 is included. This timing includes IDLE states as well as non-IDLE states. OCP timing 602 is also included in FIG. 6. The timing of AHBM and OCP are generally known, however, FIG. 6 provides an example of possible timing between the two different standards.

Figure 7:
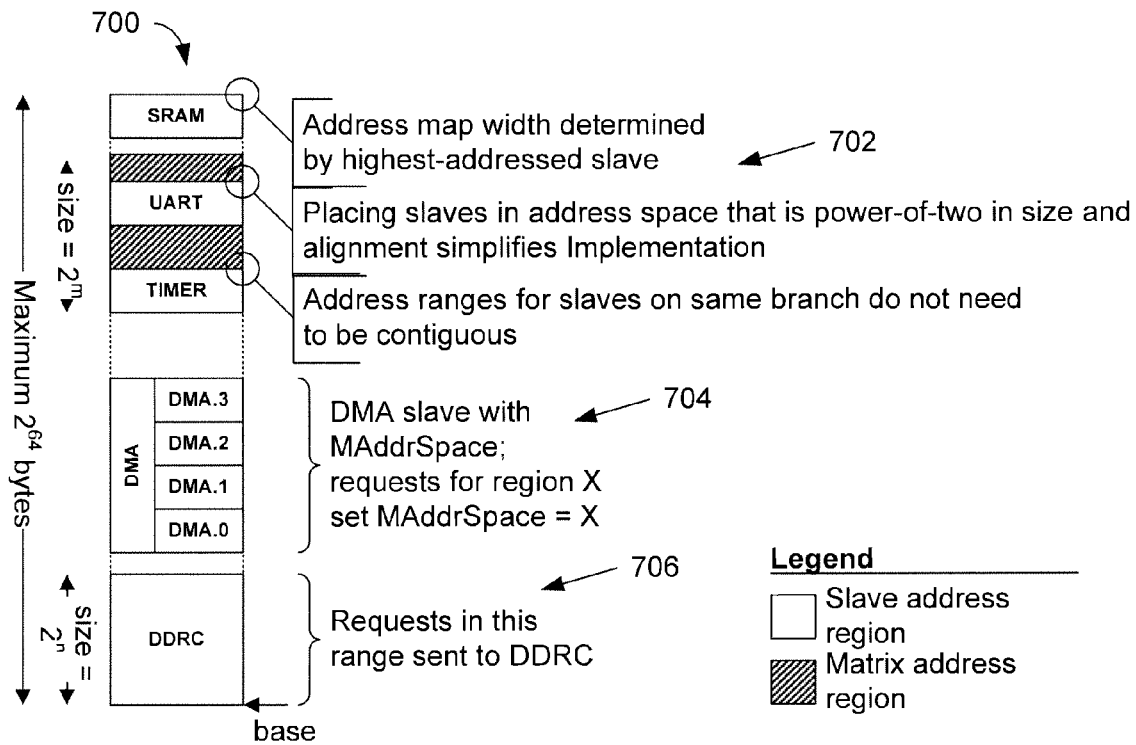
FIG. 7 illustrates an example address map in accordance with an embodiment.

FIG. 7 illustrates an example address map in accordance with an embodiment. The example address space 700 can provide a flexible address mapping mechanism for mapping targets into a global address space. As illustrated in FIG. 7, the address space 700 include support for multiple address regions 702, 704, and 706. Address regions 702, 704, and 706 can be sized based on powers of two.

Some embodiments may provide for address compression in a branch, e.g., decreasing the amount of address wires to do address decode in a branch. For example, a system with a hierarchy of buses, where address decoding is hierarchical and each bus has an address decoder, can forward some information about the address decoding status of one decoder to the next in the hierarchy. This can ease implementation of address maps, which are not strictly hierarchical (e.g., not all peripheral on a child bus are seen through the same decoding region of the parent bus). This can also reduction of the number of address wires that need to be passed from one level to the next in the bus hierarchy, providing for smaller address decoders overall.

One example proposed algorithm to optimize the number of address bits and MaddrSpace bits used by a branch can include address maps for each branch. These address maps can be computed first. All regions associated with all targets connected to each branch may be extracted to create a specification for that branch. Additionally, for each branch map, initial addr_wdth A can be set based upon A>=log 2(max (base+size)) for all regions. Initial addrspace_wdth S can be set to 0. An alternative might be selected if it reduces total address bits (S+A) from the initial solution. Therefore, a system may seek to qualify lower cost alternatives. The initial alternative trial (s,x) starts with s=1, and x=A−2. A trial is a qualified alternative if it can cover all regions.

If the initial alternative is not qualified, then the initial solution may be used. If the initial alternative is qualified, then the alternative solution will be improved as much as possible, and the result will be used. The improvements are made with a 2 level process.

The first level improvement replaces the solution with a new trial derived by decreasing x by 1, as long as that new trial is qualified. The second level improvement replaces the solution with a new trial derived by increasing s by 1 and decreasing x by 1, as long as that new trial is qualified, and then applying level one to that.

After the optimal solution is determined, the actual address space values for each region are assigned. This can be done in increasing order by moving the base address covered by the region in increments of the space size. If any regions are present, then they are assigned that space value, and the space value may then increased as the base is moved again.

The matrix address map can then created as the simple union of the branch (and individual target) maps. That map can then be reduced as your algorithm describes for contiguous regions, provided they match for address space value.

Examples of the algorithm when the following SNAP regions are mapped to different slaves of the same branch, BR1:

| Address Map 1 | | |
|---|---|---|
| Slave | Base address | Size |
| BR1.UART | 0x1FF00000 | 1 MB |
| BR1.SPI | 0x20000000 | 1 MB |
| BR1.I2C | 0x20100000 | 1 MB |
| BR1.TIMER | 0x30400000 | 1 MB |

| Address Map 2 | | | | | |
|---|---|---|---|---|---|
| Slave | SMX region | SMX base addr | SMX addr space | Branch base addr | Branch addr space |
| BR1.UART | R1 | 0x1FF00000 | 0 | 0x000000 | 0 |
| BR1.SPI | R2 | 0x20000000 | 1 | 0x000000 | 1 |
| BR1.I2C | R2 | 0x20000000 | 1 | 0x100000 | 1 |
| BR1.TIMER | TIMER | 0x30400000 | 2 | 0x000000 | 2 |

Figure 8:
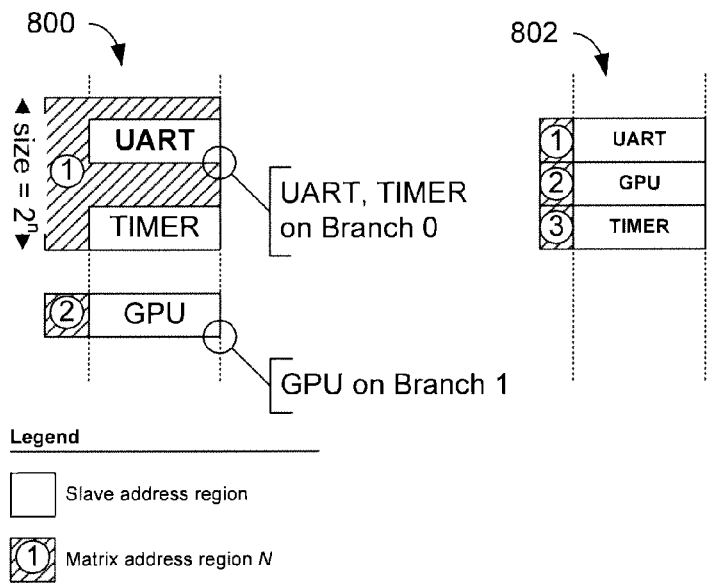
FIG. 8 illustrates another example address map in accordance with an embodiment.

FIG. 8 illustrates another example address map in accordance with an embodiment. As illustrated in FIG. 8, address map 800 might be transformed to address map 802. This may be accomplished by moving GPU into the space between UART and TIMER. This can allow for more compact memory addressing spaces with larger areas of open memory space.

In another embodiment, addressing can be modified to decrease the number of address bits. For example, a system may provide a first address decoder to communicate address bits to a second address decoder coupled downstream of an interface to an NoC. The first address decoder can communicate to a second address decoder to determine which slave between multiple slaves is an intended target of a response via one or more bits associated with an address region of an address map of the NoC. When a corresponding address region in the address map associated with the slave has two or more slaves in that region, a tag can be used to decrease an amount of address bits.

One embodiment includes an arbitration port coupled to an arbitration mechanism. The arbitration port can be a user configurable to override and augment an arbitration policy of the arbitration mechanism. Additionally, the arbitration port receives signals from components external to the NoC. The signals received from the components external to the NoC can be used to select an arbitration policy to be used.

One embodiment provides an externally control for Quality of Service (QoS) based arbitration priority. Such a system may control the behavior of a bus arbiter from an external module so that it looks like it describes a communication protocol inside two different modules of the same arbiter, which implements a two-part algorithm.

For example, in an embodiment externally controlling for QoS, arbitration priority might be used. External control of QoS can be a way to control the behavior of a bus arbiter from an external module. For example, a communication protocol inside two different modules of the same arbiter might be used to implement a two-part algorithm.

In such an embodiment, the 'priority' port is a 'slave' interface for a 'priority' bundle. This port provides a way to externally control, either statically or dynamically (for QOS), the arbitration priority used by the layer to resolve request contention among multiple masters. Existence of this port on the layer can be controlled by the 'QOS' parameter on the layer. When the interface is present the layer uses a 2 level priority scheme among contending masters. Priority within each level can be fixed, with master 0 the highest and master n the lowest.

TABLE 1

Priority Interface Signals

| Signal | Enable Parameter | Width Parameter | Direction |
|---|---|---|---|
| priority | qos = 1 | ahbm_masters | In |
| stalled | qos = 1 | ahbm_masters | out |
| write_xfer | qos = 1 | ahbm_masters | out |
| read_xfer | qos = 1 | ahbm_masters | out |

The interface can include 3 signal vectors, each having 'ahbm_masters' bits (e.g., the same number of bits as there are master ports). The priority input vector permits external control, either statically or dynamically, of the arbitration priority to be used by the layer for each master. A 1 indicates high priority, a 0 indicates low priority (so a two-level priority scheme is available). The stalled output vector provides external status. A 1 on a bit indicates the associated master was requesting but not granted in this cycle. The write_xfer output vector provides external status. It can be a one-hot vector. A 1 on a bit indicates a write data transfer was completed for the associated master. The read_xfer output vector provides external status. It is a one-hot vector. A 1 on a bit indicates a read data transfer was completed for the associated master. The stalled, write_xfer and read_xfer outputs may be useful for rate monitoring QOS schemes.

Some embodiments may interact with Advanced High-performance Bus (AHB). AHB is a bus protocol introduced in Advanced Microcontroller Bus Architecture version 2 published by ARM Ltd company. In addition to features of previous releases, the AHB bus protocol can include (1) single edge clock protocol, (2) split transactions, (3) several bus masters, (4) burst transfers, (5) pipelined operations, (6) single-cycle bus master handover, (7) non-tristate implementation, and (8) large bus-widths (64/128 bit).

A simple transaction on the AHB includes an address phase and a subsequent data phase without wait states: only two bus-cycles. Access to the target device can be controlled through a MUX (non-tristate), thereby admitting bus-access to one bus-master at a time.

AHB-Lite is a subset of AHB which is formally defined in the AMBA 3 standard. This subset simplifies the design for a bus with a single master. The ARM AMBA Support FAQ page includes notes on how integrate a full AHB master into an AHB-lite system and vice versa.

Sonics' Network for AMBA Protocol (SNAP™) is a high-performance interconnect with a multiport AHB master layers and multiport AHB or APB slave branches. SNAP may offer SoC developers a low-cost easy-to-configure bus solution specifically designed to simplify AMBA-based designs. SNAP's architecture provides an alternative for SoCs that are outgrowing traditional multi-layer AHB designs. SNAP may provide improved AHB bus performance, remove memory access bottlenecks, or provide for integrating of AXI or OCP with AHB/APB. SNAP may also provide bus design tools and design methodologies.

An embodiment includes a method to connect multiple AHB masters to an NoC. An NoC can be a module that comprises the required resources to route requests and responses from masters to targets and back, even if masters and targets have different interface protocols, data width, clock speed, etc.

In an embodiment, to provide a minimal gate cost SNAP solution, the AHB layer can be architected to minimize the number of OCP threads it presents to the Dolphin exchanges. In recognition of the fact that not all masters will be active at once, the user may be allowed to specify the maximum concurrency supported, independently from the actual master connectivity configured. The maximum concurrency can be used to configure the number of threads in the OCP interface, and masters are permitted to contend dynamically for use of the threads. This permits the user to directly control the cost vs performance trade-off.

In an embodiment, the AHB Layer holds six instance parameters named 'concurrency', 'srmd_enable', 'ahbm_interfaces', comb_hs, 'address_map', and non-block defined below.

TABLE 2

Layer Instance Parameters

| Parameter | supported & (default) values initial release | Supported & (default) values eventually |
|---|---|---|
| concurrency | (1) 1-4 | (1) 1-4 |
| srmd_enable | (1) 1 | (1) 0.1 |
| ahbm_interfaces | (1) 1-8 | (1) 1-8 |
| comb_hs | (1) 0-1 | (1) 0-1 |
| address_map | See below | See below |
| qos | (0) 0-1 | (0) 0-1 |
| nonblocking | (0) 0 | (0) 0-1 |
| synchronized_reset | (1) 0-1 | (1) 0-1 |
| asyncreset_enable | (1) 1 | (1) 0-1 |

Instance parameter 'concurrency' may be of a bounded integer type, supporting the range from 1 to 4 inclusively. The parameter specifies the maximum number of transfers that may be open at any one time on the layer. The default value of parameter 'concurrency' can be 1.

Instance parameter 'address_map' may be used when 'concurrency'>1. When 'concurrency'>1 the layer is capable of having multiple transfers open at once. When this is true, each master interface may need an address decoder to select its target so that target contention can be resolved, e.g., similar to ML-AHB. Each master interface uses an identical copy (instance) of an address decoder that implements the system address map.

The address_map parameter permits specification of the logical function of the address decoders. The decoder may identify the correct target based upon the HAddr input from the master interface. In some embodiments, an HAddr space may not be supported. Parameter 'address_map' can be a complex parameter having the following structure, which can be similar to the branch:

```
address_map {
    (region <region_name> target <target_name> {
        base <region_base>
        size <region_size>
        alias_size <alias_region_size>
    })+
```

For example a configured address_map is provided below:

```
address_map {
    region ahbs0_lower target ahbs0 {
```

```
                base 0x0
                size 0x400
            }
            region ahbs0_upper target ahbs0 {
                base 0x400
                size 0x100
            }
            region ahbs1 target ahbs1 {
                base 0x600
                size 0x100
            }
    }
```

Where the region_base is an integer (hexadecimal) with value of mapped address section starting byte address. The 'base' attribute of the address_map complex parameter can be restricted to be aligned to 1 KB memory section size which means to be aligned to 0x400 (see restriction-3). Where the region_size can be an integer (hexadecimal) with value of mapped address section range, size, or both.

SNAP architecture is a combination of a matrix, for high performance connectivity, with AHB master layers and AHB or APB slave branches, for low gate count. Each element may allow a designer the flexibility to create the optimal system architecture by finding the best trade-off between performance and area.

In an example SNAP system, the AHB master layers allow connection of up to eight AHB masters to a single matrix port. Layers are comparable in gate count to traditional AHB buses and arbitrate among all the connected masters for access to the matrix port. Unlike traditional AHB buses, however, they implement an arbitration scheme that allows more than one AHB master to have ongoing transfers simultaneously on the layer.

AHB and APB slave branches permit connection of up to sixteen AHB or APB slaves to one matrix port, providing low gate count connectivity to AHB and APB slaves.

A SNAP interconnect can be built using components from one of six categories: (1) hubs, (2) pipeline points, (3) layers, (4) branches, (5) agents, and (6) register slices. Some of these components need to be specifically instantiated and configured by the user, while some others automatically instantiated and configured by the SNAP tool.

Hubs (crossbars) provide dedicated connections between agents embedded into the hub. Layers allow multiple masters to be connected to a single hub port. Branches allow multiple slaves to be connected to a single hub port. Pipeline points are used to connect hubs within the interconnect. Agents (initiator or target) can be embedded into a hub and connect to layers, bridges, or cores outside the hub via sockets. Register slices can be used at the interface between agents and the hub fabric points.

Within the interconnect, request paths connect initiator agents to target agents and response paths connect targets to initiators. The request and response networks are completely independent. However, each component provides a piece of both the request and response networks so that the two networks are always the mirror of one another from a topological standpoint.

As discussed above, FIG. 1 illustrates a flow diagram of an embodiment of an example of a process for generating a device, such as a System on a Chip, for example, using an Electronic Design Automation (EDA) toolset. An example device includes a layer that has a protocol conversion unit that converts a request in the tightly coupled protocol, which couples request phasing with response phasing, over to a decoupled protocol, which decouples request phasing from response phasing, and then passes the request in the decoupled protocol format onto the NoC.

Hardware logic, coded software, and a combination of both may be used to implement the following design process steps using an embodiment of the EDA toolset. The EDA toolset may be a single tool or a compilation of two or more discrete tools. The information representing the apparatuses and/or methods for the circuitry in the Interconnect Memory Scheduler, etc. may be contained in an Instance such as in a cell library, soft instructions in an electronic circuit design generator, or similar machine-readable storage medium storing this information. The information representing the apparatuses and/or methods stored on the machine-readable storage medium may be used in the process of creating the apparatuses, or model representations of the apparatuses such as simulations and lithographic masks, and/or methods described herein.

Aspects of the above design may be part of a software library containing a set of designs for components making up the scheduler and Interconnect and associated parts. The library cells are developed in accordance with industry standards. The library of files containing design elements may be a stand-alone program by itself as well as part of the EDA toolset.

The EDA toolset may be used for making a highly configurable, scalable System-On-a-Chip (SOC) inter block communication system that integrally manages input and output data, control, debug and test flows, as well as other functions. In an embodiment, an example EDA toolset may comprise the following: a graphic user interface; a common set of processing elements; and a library of files containing design elements such as circuits, control logic, and cell arrays that define the EDA tool set. The EDA toolset may be one or more software programs comprised of multiple algorithms and designs for the purpose of generating a circuit design, testing the design, and/or placing the layout of the design in a space available on a target chip. The EDA toolset may include object code in a set of executable software programs. The set of application-specific algorithms and interfaces of the EDA toolset may be used by system integrated circuit (IC) integrators to rapidly create an individual IP core or an entire System of IP cores for a specific application. The EDA toolset provides timing diagrams, power and area aspects of each component and simulates with models coded to represent the components in order to run actual operation and configuration simulations. The EDA toolset may generate a Netlist and a layout targeted to fit in the space available on a target chip. The EDA toolset may also store the data representing the interconnect and logic circuitry on a machine-readable storage medium.

Generally, the EDA toolset is used in two major stages of SOC design: front-end processing and back-end programming. The EDA toolset can include one or more of a RTL generator, logic synthesis scripts, a full verification testbench, and SystemC models.

Front-end processing includes the design and architecture stages, which includes design of the SOC schematic. The front-end processing may include connecting models, configuration of the design, simulating, testing, and tuning of the design during the architectural exploration. The design is typically simulated and tested. Front-end processing traditionally includes simulation of the circuits within the SOC and verification that they should work correctly. The tested and verified components then may be stored as part of a stand-alone library or part of the IP blocks on a chip. The front-end views support documentation, simulation, debugging, and testing.

In block 105, the EDA tool set may receive a user-supplied text file having data describing configuration parameters and a design for at least part of a layer that has a protocol conversion unit that converts a request in the tightly coupled protocol, which couples request phasing with response phasing, over to a decoupled protocol, which decouples request phasing from response phasing, and then passes the request in the decoupled protocol format onto the NoC. The data may include one or more configuration parameters for that IP block. The IP block description may be an overall functionality of that IP block such as an Interconnect, memory scheduler, etc. The configuration parameters for the Interconnect IP block and scheduler may include parameters as described previously.

The EDA tool set receives user-supplied implementation technology parameters such as the manufacturing process to implement component level fabrication of that IP block, an estimation of the size occupied by a cell in that technology, an operating voltage of the component level logic implemented in that technology, an average gate delay for standard cells in that technology, etc. The technology parameters describe an abstraction of the intended implementation technology. The user-supplied technology parameters may be a textual description or merely a value submitted in response to a known range of possibilities.

The EDA tool set may partition the IP block design by creating an abstract executable representation for each IP sub component making up the IP block design. The abstract executable representation models TAP characteristics for each IP sub component and mimics characteristics similar to those of the actual IP block design. A model may focus on one or more behavioral characteristics of that IP block. The EDA tool set executes models of parts or all of the IP block design. The EDA tool set summarizes and reports the results of the modeled behavioral characteristics of that IP block. The EDA tool set also may analyze an application's performance and allows the user to supply a new configuration of the IP block design or a functional description with new technology parameters. After the user is satisfied with the performance results of one of the iterations of the supplied configuration of the IP design parameters and the technology parameters run, the user may settle on the eventual IP core design with its associated technology parameters.

The EDA tool set integrates the results from the abstract executable representations with potentially additional information to generate the synthesis scripts for the IP block. The EDA tool set may supply the synthesis scripts to establish various performance and area goals for the IP block after the result of the overall performance and area estimates are presented to the user.

The EDA tool set may also generate an RTL file of that IP block design for logic synthesis based on the user supplied configuration parameters and implementation technology parameters. As discussed, the RTL file may be a high-level hardware description describing electronic circuits with a collection of registers, Boolean equations, control logic such as "if-then-else" statements, and complex event sequences.

In block 110, a separate design path in an ASIC or SOC chip design is called the integration stage. The integration of the system of IP blocks may occur in parallel with the generation of the RTL file of the IP block and synthesis scripts for that IP block.

The EDA toolset may provide designs of circuits and logic gates to simulate and verify the operation of the design works correctly. The system designer codes the system of IP blocks to work together. The EDA tool set generates simulations of representations of the circuits described above that can be functionally tested, timing tested, debugged and validated. The EDA tool set simulates the system of IP block's behavior. The system designer verifies and debugs the system of IP blocks' behavior. The EDA tool set tool packages the IP core. A machine-readable storage medium may also store instructions for a test generation program to generate instructions for an external tester and the interconnect to run the test sequences for the tests described herein. One of ordinary skill in the art of electronic design automation knows that a design engineer creates and uses different representations, such as software coded models, to help generating tangible useful information and/or results. Many of these representations can be high-level (abstracted and with less details) or top-down views and can be used to help optimize an electronic design starting from the system level. In addition, a design process usually can be divided into phases and at the end of each phase, a tailor-made representation to the phase is usually generated as output and used as input by the next phase. Skilled engineers can make use of these representations and apply heuristic algorithms to improve the quality of the final results coming out of the final phase. These representations allow the electric design automation world to design circuits, test and verify circuits, derive lithographic mask from Netlists of circuit and other similar useful results.

In block 115, next, system integration may occur in the integrated circuit design process. Back-end programming generally includes programming of the physical layout of the SOC such as placing and routing, or floor planning, of the circuit elements on the chip layout, as well as the routing of all metal lines between components. The back-end files, such as a layout, physical Library Exchange Format (LEF), etc. are generated for layout and fabrication.

The generated device layout may be integrated with the rest of the layout for the chip. A logic synthesis tool receives synthesis scripts for the IP core and the RTL design file of the IP cores. The logic synthesis tool also receives characteristics of logic gates used in the design from a cell library. RTL code may be generated to instantiate the SOC containing the system of IP blocks. The system of IP blocks with the fixed RTL and synthesis scripts may be simulated and verified. Synthesizing of the design with Register Transfer Level (RTL) may occur. The logic synthesis tool synthesizes the RTL design to create a gate level Netlist circuit design (i.e. a description of the individual transistors and logic gates making up all of the IP sub component blocks). The design may be outputted into a Netlist of one or more hardware design languages (HDL) such as Verilog, VHDL (Very-High-Speed Integrated Circuit Hardware Description Language) or SPICE (Simulation Program for Integrated Circuit Emphasis). A Netlist can also describe the connectivity of an electronic design such as the components included in the design, the attributes of each component and the interconnectivity amongst the components. The EDA tool set facilitates floor planning of components including adding of constraints for component placement in the space available on the chip such as XY coordinates on the chip, and routes metal connections for those components. The EDA tool set provides the information for lithographic masks to be generated from this representation of the IP core to transfer the circuit design onto a chip during manufacture, or other similar useful derivations of the circuits described above. Accordingly, back-end programming may further include the physical verification of the layout to verify that it is physically manufacturable and the resulting SOC will not have any function-preventing physical defects.

In block 120, a fabrication facility may fabricate one or more chips with the signal generation circuit utilizing the lithographic masks generated from the EDA tool set's circuit design and layout. Fabrication facilities may use a standard CMOS logic process having minimum line widths such as 1.0 um, 0.50 um, 0.35 um, 0.25 um, 0.18 um, 0.13 um, 0.10 um, 90 nm, 65 nm or less, to fabricate the chips. The size of the CMOS logic process employed typically defines the smallest minimum lithographic dimension that can be fabricated on the chip using the lithographic masks, which in turn, determines minimum component size. According to one embodiment, light including X-rays and extreme ultraviolet radiation may pass through these lithographic masks onto the chip to transfer the circuit design and layout for the test circuit onto the chip itself.

The EDA toolset may have configuration dialog plug-ins for the graphical user interface. The EDA toolset may have an RTL generator plug-in for the SocComp. The EDA toolset may have a SystemC generator plug-in for the SocComp. The EDA toolset may perform unit-level verification on components that can be included in RTL simulation. The EDA toolset may have a test validation testbench generator. The EDA toolset may have a dis-assembler for virtual and hardware debug port trace files. The EDA toolset may be compliant with open core protocol standards. The EDA toolset may have Transactor models, Bundle protocol checkers, OCPDis2 to display socket activity, OCPPerf2 to analyze performance of a bundle, as well as other similar programs.

Some aspects may be implemented in software as a set of data and instructions, such as an instance in a software library callable to other programs or consisting of an executable program with the software cell library in one program, stored on a machine-readable medium. A machine-readable storage medium may include any mechanism that provides (e.g., stores and/or transmits) information in a form readable by a machine (e.g., a computer). For example, a machine-readable medium may include, but is not limited to: read only memory (ROM); random access memory (RAM); magnetic disk storage media; optical storage media; flash memory devices; DVD's; EPROMs; EEPROMs; FLASH, magnetic or optical cards; or any other type of media suitable for storing electronic instructions. The instructions and operations also may be practiced in distributed computing environments where the machine-readable media is stored on and/or executed by more than one computer system. In addition, the information transferred between computer systems may either be pulled or pushed across the communication media connecting the computer systems.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In an embodiment, the logic includes electronic circuits that follow the rules of Boolean Logic, software that contain patterns of instructions, or any combination of both. Various components described above may be implemented in hardware logic, software, or any combination of both.

While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The invention is to be understood as not limited by the specific embodiments described herein, but only by scope of the appended claims.

We claim:

1. A method of layer concurrency connecting two or more master Intellectual Property cores to a Network on the Chip (NoC) for an integrated circuit comprising:

connecting two or more masters using a common tightly coupled protocol to a first interface of the NoC which is a communication-bus module that includes transaction flow control logic, registers, and volatile memory components including buffers to route requests and responses from masters to one or more target IP cores and back, even when the masters and targets connected to that NoC have different interface protocols, data width, or clock speed;

wherein the NoC has internal flow control logic to support protocols, including OCP multithread protocol and AXI protocol, that support sending one or more responses back to the master, in which the requests were serviced out-of-order from the order in which the requests were issued from the master;

converting a protocol, where a protocol conversion unit coupled between the two or more masters and the NoC, where the protocol conversion unit converts a request in the tightly coupled protocol that couples request phasing with response phasing over to a decoupled protocol that decouples request phasing from response phasing and then passes the request in the decoupled protocol format onto the NoC; and configuring for arbitration amongst the two or more masters while any requests from the masters are still in the common tightly coupled protocol of the masters' first, and only then translating the requests in the tightly coupled protocol for the winning request by the protocol conversion unit into a request in a decoupled protocol to enable out of order return of responses.

2. The method of claim 1, wherein the two or more masters use an AHB type of the tightly coupled protocol including AHB and AHB-Lite, wherein a request in the AHB type of the tightly coupled protocol format from each AHB master is:

translated and converted to an internal protocol in a layer between the NoC and the masters, where the internal protocol is not the NoC protocol, where the layer contains the arbitration unit and the protocol conversion unit;

arbitrated, wherein the winning request of the arbitration is converted to a first request following the internal protocol which is a multiple threaded protocol including OCP to manage concurrency of multiple requests issued from the layer at the same time and out of order responses coming back to the layer for those outstanding concurrent requests; and the multiple threaded request in the internal protocol format is converted by an NoC protocol conversion unit when needed due to the protocol of the NoC differing from an internal protocol of the layer that is used to convert the multiple threaded requests into the protocol of the NoC and wherein that protocol is the AHB type of the tightly coupled protocol that couples request phasing with response phasing.

3. The method of claim 1, further comprising:
managing multiple threads that have issued one or more requests from the layer onto the NoC and responses returning back to the NoC, and wherein OCP threads are used to implement a bus-like structure in the layer, which can be multiplexed in time across different concurrent ongoing transactions such that the OCP threads are used to connect the layer to an NoC port to achieve increased performance and wherein the bus-like structure used is a fine-grained structure multiplexed in time between multiple concurrent requests that can be outstanding going across the NoC at the same time.

4. The method of claim 1, wherein a protocol conversion unit converts a request in a non-pipelined protocol that couples request phasing with response phasing to pipeline responses back to a master and wherein the protocol decouples requests and responses and wherein the protocols include the OCP and AXI protocols;
wherein the NoC implements a pipelined and tightly coupled protocol that couples request phasing with response phasing; and
where one NoC port is used for each master connecting to the layer containing the arbitration unit and the protocol conversion unit even when a common tightly coupled protocol is used by each master and each master request is independently translated to the decoupled protocol.

5. The method of claim 1, further comprising:
using a layer that has a run time configurable parameter to select the number of threads the layer is capable of processing and configured with instances of logic to present threads to the NoC;
wherein, in recognition of the fact that not all masters will be active at once, a maximum concurrency supported can be specified, independently from an actual number of masters connected to that layer; and
wherein the parameter specifies a maximum number of transfers that may be open at any one time on the layer.

6. The method of claim 1, further comprising:
using a layer that includes a multiplexer, wherein the layer is capable of having multiple transfers open at once, and wherein, when multiple transfers are open at once, each master interface has an address decoder to select its target so that target contention can be resolved; and
wherein the interconnect comprises a high-performance interconnect with multiport AHB master layers and multiport AHB or APB slave branches.

7. The method of claim 1, further comprising:
using either hardware logic or software visible registers to allow a user to configure a system to map a non-pipelined master to a tag or thread identification associated with registers coming into a layer that implements a non-pipeline protocol and maps responses back to corresponding master tag or thread identification; and
wherein the non-pipelined protocol comprises the AHB protocol.

8. The method of claim 1, further comprising:
a layer component that includes logic to arbitrate simultaneous requests from multiple masters, multiplexing the requests to the attached initiator agent, wherein a user can select between two arbitration protocols and two models of concurrency to optimize latency and throughput for the attached masters and the gate count of the layer component;
wherein, by default, the layer component uses a fixed priority arbitration scheme to arbitrate among competing requests; in this one-level scheme, the attached masters are numbered and lower-numbered masters have priority over higher-numbered masters;
wherein, the user may optionally specify the use of a priority input, which enables a priority selector port in the layer component, the priority selector port providing a priority input signal which is used in a two-level arbitration scheme which includes
arbitration following the one-level, fixed priority scheme and wherein the lowest-numbered master wins when no master has its priority input signal asserted,
wherein a master with a priority input signal asserted wins when only that master has its priority input signal asserted, and
wherein the lowest numbered master with an active priority input wins when more than one master has its priority input signal asserted.

9. The method of claim 1, further comprising:
using the NoC configured to support concurrent transactions such that a layer is able to send requests from multiple masters to one or more targets concurrently, and to receive the responses from the targets out of order and distribute them properly to the respective masters;
wherein an arbitration protocol is used such that when any master in a concurrency group has an open locked transaction, no further transactions from any other master in the group may be opened;
wherein concurrency groups are numbered and each master in a layer is assigned to one of the concurrency groups;
wherein masters assigned to different concurrency groups may be serviced concurrently and masters assigned to the same concurrency group will be serviced sequentially; and
wherein the number of threads in the layer's OCP interface matches the layer's concurrency level.

10. The method of claim 1, further comprising:
providing a first address decoder to communicate address bits to a second address decoder coupled downstream of an interface to the NoC, wherein the first address decoder communicates to the second address decoder to determine which slave between multiple slaves is an intended target of a response via one or more bits associated with an address region of an address map of the NoC; and
wherein, when a corresponding address region in the address map associated with the slave has two or more slaves in that region, a tag is used to decrease an amount of address bits.

11. The method of claim 1, further comprising:
using an arbitration port coupled to an arbitration mechanism, wherein the arbitration port is user configurable to override an arbitration policy of the arbitration mechanism;
wherein the arbitration port receives signals from components external to the NoC; and
wherein the signals received from the components external to the NoC implement the arbitration policy.

12. The method of claim 1, further comprising:
providing an external control for Quality of Service (QoS) based arbitration priority, and further comprising controlling the behavior of a bus arbiter from an external module so that it describes a communication protocol inside two different modules of the same arbiter.

13. The method of claim 1, further comprising:
multiple masters with one address, each master having an identification assigned by the NoC;

wherein each of the initiators communicates with a single slave such that the NoC can route communications between a first master and a first slave;

the communication using the single address for each master and the identification assigned by the NoC to determine a routing of the communication to or from the first slave; and wherein the single address can be shared by the multiple masters using the identification assigned by the NoC and the mapping of the first master to the first slave.

14. A system for connecting two or more masters to a Network on the Chip (NoC) for an integrated circuit comprising:

the NoC which is a communication-bus module that includes transaction flow control logic, registers, and volatile memory components, including buffers, to route requests and responses from masters to targets and back, even when the masters and targets have different interface protocols, data width, or clock speed;

wherein the NoC has internal flow control logic to that supports sending one or more responses back to the master, where the requests were serviced out-of-order from an order in which the requests were issued from the master;

a layer connecting to two or more masters that uses a common tightly coupled protocol, where the layer has the components of multiple ports connecting to a multiplexer, the multiplexer connecting to an arbitration unit, the arbitration unit connecting to a protocol translation unit, and thread management logic, the registers, and the buffers to track threads issued from the layer onto the NoC; and wherein a first request from a master is:
  translated and converted to an internal protocol which is not the NoC protocol;
  arbitrated, wherein a winner of the arbitration is converted to a first request following an OCP multithreaded protocol; and
  the OCP multithreaded request is converted in an NoC protocol conversion unit to a non-pipelined protocol that couples request phasing with response phasing.

15. The system of claim 14, wherein OCP threads are used to implement a bus-like structure, which can be multiplexed in time across different concurrent ongoing transactions such that the OCP threads are used to connect the layer to a NoC port to achieve increased performance at a moderate hardware cost, and wherein the bus structure used is a fine-grained structure multiplexed in time between multiple concurrent requests that can be ongoing simultaneously.

16. The system of claim 14, further comprising:
the layer that includes the multiplexer, wherein the layer is configured to have multiple transfers open at once, and wherein, when multiple transfers are open at once, each master interface has an address decoder to select its target so that target contention can be resolved, and
wherein the NoC comprises a high-performance interconnect with multiport AHB master layers and multiport AHB or APB slave branches.

17. A system for connecting two or more masters to a Network on the Chip (NoC) for an integrated circuit comprising:

the NoC which is a communication-bus module that includes transaction flow control logic, registers, and volatile memory components, including buffers, to route requests and responses from masters to targets and back, even when the masters and targets have different interface protocols, data width, or clock speed;

wherein the NoC has internal flow control logic that supports sending one or more responses back to the master, where the requests were serviced out-of-order from the order in which the requests were issued from the master;

a layer connecting to two or more masters that uses a common tightly coupled protocol, where the layer has the components of multiple ports connecting to a multiplexer, the multiplexer connecting to an arbitration unit, the arbitration unit connecting to the protocol translation unit, and to a thread management logic, where registers and buffers track threads issued from the layer onto the NoC;

a protocol conversion unit that converts a first request in a non-pipelined protocol that couples request phasing with response phasing to pipeline the responses back to the master and wherein the protocol conversion unit decouples the requests and the responses and wherein the protocols of the protocol conversion unit include OCP and AXI protocols;

wherein the NoC implements the non-pipelined protocol that couples the request phasing with the response phasing to the NoC;

wherein one NoC port is used for each master even when a common protocol is used and each master request is independently translated to the NoC protocol;

wherein the NoC is the communication bus module which includes a register resource to route the requests and the responses even when the requestor or responder have different data width or clock speed requirements;

a first master connected to the NoC; and a second master connected to the NoC.

18. A system for connecting two or more masters to a Network on the Chip (NoC) for an integrated circuit comprising:

the NoC which is a communication-bus module that includes transaction flow control logic, registers, and volatile memory components, including buffers, to route requests and responses from the masters to targets and back, even when the masters and targets have different interface protocols, data width, or clock speed;

wherein the NoC has internal flow control logic that supports sending one or more responses back to the master, where the requests were serviced out-of-order from the order in which the requests were issued from the master;

a layer connecting to the two or more masters that uses a common tightly coupled protocol, where the layer has the components of multiple ports connecting to a multiplexer, the multiplexer connecting to an arbitration unit, the arbitration unit connecting to a protocol translation unit, and thread management logic, registers, and buffers to track threads issued from the layer onto the NoC;

wherein the NoC includes the layer that is architected to minimize a number of threads it presents to an exchange, wherein the NoC includes an input that allows a user to specify a maximum concurrency supported, independently from an actual master connectivity configured, wherein a maximum concurrency is used to configure the number of threads in the interface, and the masters are permitted to contend dynamically for use of the threads, and wherein a parameter specifies a maximum number of transfers that may be open at any one time on the layer.

19. A system for connecting two or more masters to a Network on the Chip (NoC) for an integrated circuit comprising:

the NoC which is a communication-bus module that includes transaction flow control logic, registers, and volatile memory components, including buffers, to route requests and responses from masters to targets and back, even when the masters and targets have different interface protocols, data width, or clock speed;

wherein the NoC has internal flow control logic that supports sending one or more responses back to the master, where the requests were serviced out-of-order from the order in which the requests were issued from the master;

a layer connecting to the two or more masters that uses a common tightly coupled protocol, where the layer has the components of multiple ports connecting to a multiplexer, the multiplexer connecting to an arbitration unit, the arbitration unit connecting to the protocol translation unit, and thread management logic, registers, and buffers to track threads issued from the layer onto the NoC;

wherein a layer component includes logic to arbitrate simultaneous requests from multiple masters, multiplexing the requests to the attached initiator agent, wherein a user can select between two arbitration protocols and two models of concurrency to optimize latency and throughput for the attached masters and the gate count of the layer component;

wherein, by default, the layer component uses a fixed priority arbitration scheme to arbitrate among competing requests, and in this one-level scheme, the attached masters are numbered and lower-numbered masters have priority over higher-numbered masters;

wherein, the user may optionally specify the use of a priority input, which enables a priority selector port in the layer component, the priority selector port providing a priority input signal which is used in a two-level arbitration scheme that includes arbitration that follows the one-level, fixed priority scheme and wherein the lowest-numbered master wins when no master has its priority input signal asserted, wherein a first master with a priority input signal asserted wins when only that first master has its priority input signal asserted, and wherein the lowest numbered master with an active priority input wins when more than one master has its priority input signal asserted.

* * * * *